US010138983B2

(12) United States Patent
Hose et al.

(10) Patent No.: US 10,138,983 B2
(45) Date of Patent: Nov. 27, 2018

(54) TRANSMISSION (71) Applicant: JAGUAR LAND ROVER LIMITED, Warwickshire (GB)

(72) Inventors: Markus Hose, Coventry (GB); Russell Osborn, Coventry (GB); Fred Hyde, Coventry (GB); Matt Hole, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 436 days.

(21) Appl. No.: 14/787,831

(22) PCT Filed: Apr. 18, 2014

(86) PCT No.: PCT/EP2014/057999
§ 371 (c)(1),
(2) Date: Oct. 29, 2015

(87) PCT Pub. No.: WO2014/177405
PCT Pub. Date: Nov. 6, 2014

(65) Prior Publication Data
US 2016/0076626 A1 Mar. 17, 2016

(30) Foreign Application Priority Data

May 1, 2013 (GB) .................................. 1307859.7

(51) Int. Cl.
*F16H 3/093* (2006.01)
*F16H 3/00* (2006.01)
(Continued)

(52) U.S. Cl.
CPC ............. *F16H 3/093* (2013.01); *B60K 17/08* (2013.01); *F16H 3/006* (2013.01); *F16H 3/097* (2013.01);
(Continued)

(58) Field of Classification Search
CPC .......... F16H 3/006; F16H 3/093; F16H 3/097; F16H 2003/0822; F16H 2003/0931;
(Continued)

(56) References Cited

U.S. PATENT DOCUMENTS

| 2004/0093972 A1 | 5/2004 | Gumpoltsberger et al. |
| 2008/0141808 A1 | 6/2008 | Gumpoltsberger |
| 2008/0202267 A1 | 8/2008 | Hendrickson et al. |

FOREIGN PATENT DOCUMENTS

| DE | 100 43 060 | * | 2/2002 |
| EP | 1450075 A2 | | 8/2004 |

(Continued)

OTHER PUBLICATIONS

Combined Search and Examination Report under Sections 17 and 18(3) for Application No. GB1307859.7 dated Oct. 31, 2013.
(Continued)

*Primary Examiner* — William C Joyce
(74) *Attorney, Agent, or Firm* — Carlson, Gaskey & Olds (57) ABSTRACT

A constant mesh gear transmission has an input shaft (21, 22), two layshafts (31, 35) and an output shaft (23). Gear wheels are selectively connectable to shafts to provide forward and reverse speed ratios. A common central web (39) provides central support bearings for the shafts. The transmission is stiffened, and allows assembly of components from either end to the middle.

20 Claims, 7 Drawing Sheets

(51) Int. Cl.
*F16H 3/097* (2006.01)
*F16H 57/021* (2012.01)
*B60K 17/08* (2006.01)
F16H 57/02 (2012.01)
B60K 17/346 (2006.01)
F16H 3/08 (2006.01)

(52) U.S. Cl.
CPC .......... *F16H 57/021* (2013.01); *B60K 17/346* (2013.01); *F16H 2003/0822* (2013.01); *F16H 2003/0931* (2013.01); *F16H 2003/0933* (2013.01); *F16H 2057/0216* (2013.01); *F16H 2057/02047* (2013.01); *F16H 2200/006* (2013.01); *F16H 2200/0086* (2013.01)

(58) Field of Classification Search
CPC ..... F16H 2003/0933; F16H 2200/0082; F16H 2200/0086

USPC ................................................ 74/330, 331
See application file for complete search history.

(56) References Cited

FOREIGN PATENT DOCUMENTS

| | | |
|---|---|---|
| EP | 1467128 A1 | 10/2004 |
| FR | 2897407 A1 | 8/2007 |
| JP | 2005003073 A | 1/2005 |
| WO | 2007065560 A1 | 6/2007 |
| WO | 2012023110 A1 | 2/2012 |
| WO | WO 2017/121813 * | 7/2017 |

OTHER PUBLICATIONS

International Search Report for International application No. PCT/EP2014/057999 dated Jul. 31, 2014.

* cited by examiner

TRANSMISSION

TECHNICAL FIELD

The present invention relates to a gear transmission and particularly, but not exclusively, to a transmission having a plurality of selectable speed ratios provided by respective trains of gear wheels. Aspects of the invention relate to a gearbox, to a powertrain and to a vehicle.

BACKGROUND

Gear transmissions are typically used in motor vehicles, and multiple speed ratios allow the engine characteristics to be best matched to the required gradient launch, acceleration, top speed, fuel economy and other well understood factors. Gear pairs are typically in constant mesh, and are engaged and disengaged by synchromesh mechanisms which incorporate dog clutches. Manual selection of the required speed ratio is common, but some gear transmission variants have automated or assisted selection, or have fully automatic speed ratio selection.

In order to achieve good acceleration and fuel economy, the number of speed ratios have increased in recent years, and for some vehicles as many as eight or more forward speed ratios may be provided. Inevitably, these additional speed ratios tend to increase the size of the transmission, which is problematic for vehicle designers where the available space envelope is restricted.

Another objective of vehicle designers is to design components for a range of vehicles, so a substantially common base component is modified to suit the particular attributes which are required of each vehicle in the range. In one extreme example a common component, such as a vehicle transmission, may be required to serve in both a sports car and a vehicle having off-road capability. The base component may be simple and have features added thereto, or it may be complex and have features deleted. Options for placement of auxiliary components, such as differential gears, and for providing alternative output locations, are desirable.

SUMMARY OF THE INVENTION

According to an embodiment of the invention there is provided a constant mesh gearbox providing a plurality of forward speed ratios, said gearbox comprising a casing defining a plurality of parallel shaft axes having shafts rotatable thereon, and between which gear wheel pairs associated with each speed ratio are arranged to transmit torque, said casing further defining a support plane substantially orthogonal to said axes and containing a support bearing for a shaft on each of said axes, said gearbox providing four or more forward speed ratios, the gear wheel pairs associated with the 'odd' forward speed ratios being provided on one side of said support plane, and the gear pairs associated the 'even' forward speed ratios being provided on the other side of said support plane, said gearbox also having two reverse speed ratios, the gear wheel pairs associated with one of said reverse speed ratios being provided on one side of said support plane, and the gear wheel pairs associated with the other of said reverse speed ratio being provided on the other side of said support plane.

The gearbox of embodiments of the invention is substantially symmetrically arranged on either side of the support plane, which is situated approximately centrally within the gear wheel set. Typically, considering the forward speed ratios, one gear wheel pair is provided for each speed ratio, between an input shaft and a layshaft. Each gear wheel pair individually connectable for drive from the input shaft. The layshaft may be in driving engagement with an input shaft or with an output shaft, usually via a gear wheel pair.

In an embodiment of the invention, the layshaft is connected by gear wheel pair to an output shaft, and the output shaft is co-axial with an input shaft. Each gear wheel pair associated with a speed ratio is connectable to either an input shaft or to a layshaft via a disengageable coupler, typically a synchromesh coupler.

In an embodiment the casing defines support for the shafts that support gear wheel pairs, both at the ends thereof and in the support plane. The support plane is defined in the casing by a transverse web, which may be additionally apertured to reduce material mass and to permit flow of lubricant within the casing. The transverse web may constitute a partition wall at approximately the mid-point of the gearbox, in the direction of the shaft axes. The support plane, or transverse web, may in one embodiment constitute a one or more reference surfaces for assembling the internal component of the gearbox. In particular the internal components may be assembled from either end towards the middle. Thus the casing may be defined by an open end at each axial extremity, the components being inserted into the casing from one or other end, and the open ends being closed by suitable cover plates or other driveline components. The facility to assemble from two ends may substantially reduce the risk of misassembly since the number of components to be inserted from either end is approximately halved as compared with single ended assembly of a corresponding conventional gearbox.

A support plane or transverse web may define a single reference surface on either side thereof for several parallel shafts; the ability to machine such a single reference surface provides an improvement as compared with providing an individual reference surface for each shaft and the components thereon.

A transverse web at the approximate centre of the gearbox substantially improves the stiffness of the casing, and hence the dimensional variation thereof in use. Such a gearbox may exhibit reduced wear and noise.

In one embodiment the gearbox is a dual clutch transmission (DCT) of generally conventional kind in which two input shafts are alternately engageable with a source of motive power (for example an internal combustion engine) to provide a power shift of speed ratio. DCT transmissions are well known, and need not be further described here.

In an embodiment, the two input shafts are co-axial, one within another. The support plane provides a central rotational support for the radially inner input shaft. The support plane may provide rotational support for one end of the radially outer input shaft.

In an embodiment of the invention the 'even' speed ratios of a DCT variant are associated with the radially outer input shaft, and the 'odd' speed ratios are associated with the radially inner input shaft.

The casing may be barrel-like, with a central web defining the support plane for the shafts rotatable therein, and appropriate openings for a selector mechanism associated with selection and pre-selection (in a DCT variant) of speed ratios.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

One or more embodiments of the invention will now be described, by way of example only, with reference to the accompanying drawings in which.

DETAILED DESCRIPTION

Figure 1:
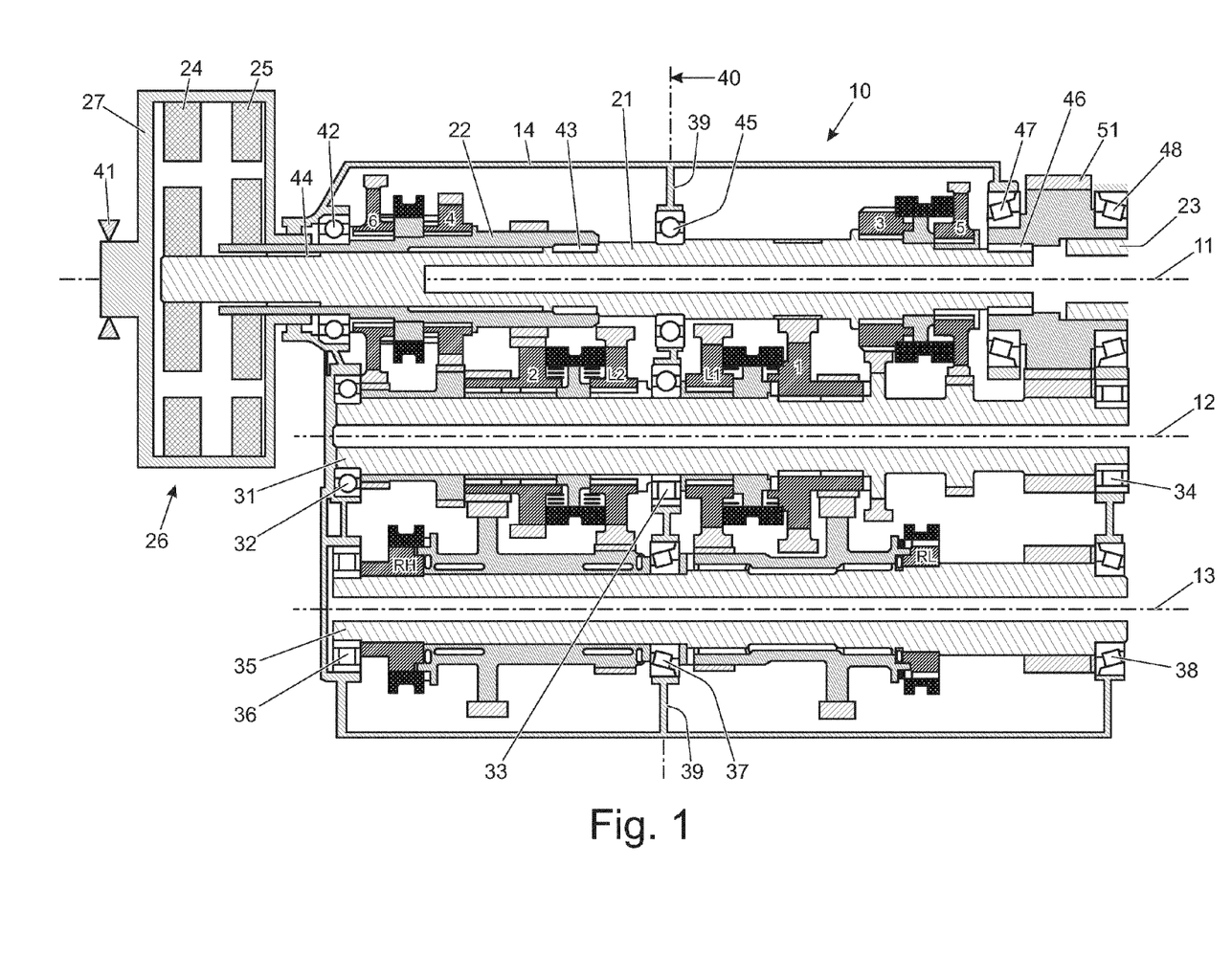
FIG. 1 is a somewhat schematic developed longitudinal cross-section through a transmission according to an embodiment of the invention.

A gear transmission 10 according to an embodiment of the invention is illustrated in FIG. 1, and comprises a plurality of shafts rotatable about three parallel axes 11, 12, 13 within a casing 14 to define a north/south (longitudinal) arrangement. The illustrated embodiment of the invention is a dual clutch transmission (DCT) but as will be described below, a conventional single clutch variant is also possible.

Figure 3:
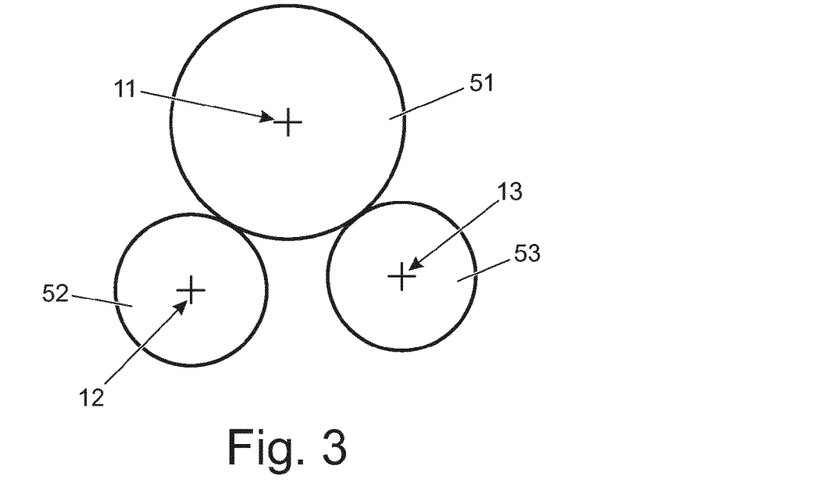
FIG. 3 illustrates an arrangement of axes from one end of the transmission of FIGS. 1 and 2.

The transmission of FIG. 1 is developed so as to be illustrated in a single plane for the purposes of description. A practical embodiment has the axes arranged in triangular form, as will also become apparent, and is illustrated in FIG. 3.

The uppermost axis 11 (as viewed) comprises an input/output axis on which is rotatable an inner input shaft 21, an outer input shaft 22 and an output shaft 23. The input shafts 21, 22 are driven via respective driven plates 24, 25 of a dual clutch 26, each driven plate being engageable on demand with a driving member 27 coupled to a motor or engine (not shown). Dual clutch transmissions are well known, and need not be further described here, except to say that one driven plate 24 is associated with the 'odd' transmission ratios, and the other driven plate is associated with the 'even' transmission ratios; the clutches are engaged alternately to permit pre-selection of the next desired speed ratio, and a power shift with no break in torque delivery.

The driving member 27, typically a flywheel of an internal combustion engine is supported at the input side by at least a bearing schematically shown at 41. The outer input shaft 22 is supported in the casing 14 by a ball bearing 42, and by a needle roller bearing 43 on the inner input shaft 21. In turn the inner input shaft 21 is supported in the outer input shaft 22 by a needle roller bearing 44, and in the transmission casing 14 by a ball bearing 45.

The shaft bearings generally include rolling elements, and will be selected according to the intended duty and according to whether a thrust load must be supported. In the described embodiments, ball bearings, roller bearings and taper roller bearings are illustrated.

At the tail end of the transmission, the inner input shaft 21 is supported in an output gear 51 by a needle roller bearing 46, and the output gear is in turn supported at one side in the casing 14 by a roller bearing 47. A second roller bearing 48 supports the other side of the output gear 51, and may be itself supported by the transmission casing 14 or by an output component such as the casing of a differential gear, as will be further described below.

The centre axis 12 (as viewed) comprises a first layshaft axis on which is provided a 'forward' layshaft 31 which is supported for rotation in the casing 14 by ball and roller bearings 32-34.

The lowermost axis 13 (as viewed) comprises a second layshaft axis on which is provided a 'reverse' shaft 35, which is supported for rotation in the casing 14 by roller bearings 36-38. Although conveniently termed 'reverse' layshaft since it is associated with reverse speed ratios, this shaft 35 also defines a rotational axis for certain forward speed ratios, as will become apparent.

The bearings described in relation to the input shafts 21, 22 and layshafts 31, 35 are selected according to the anticipated duty and load by the skilled transmission designer, but are conventional. Other kinds of bearing, such as plain bearings may be suitable in some circumstances. Furthermore lubricating oil under pressure may be supplied to the bearings where splash or immersion is insufficient.

As with most conventional multi-axis transmissions having shafts, support bearings are provided at the opposite shaft ends. In the disclosed embodiment such bearings are provided substantially in end planes 70, 80. A notable feature of the embodiment of FIG. 1 is that each of the shafts 21, 31, 35 includes a centre support bearing 45, 33, 37, and that these bearings are aligned in a substantially common support plane 40 transverse to the shaft axes 11-13. A central web 39 of the transmission casing 14 supports the bearings 45, 33, 37, and constitutes a partition wall with apertures (not shown) to permit lubricating oil to flow from one side to the other.

Mounted or formed upon the shafts 21, 22, 31, 35 are a plurality of gear wheels selectable in sequence to give eight forward speed ratios, and two reverse speed ratios. Selection of a gear wheel path is by conventional synchromesh couplers, as will be described below. Synchromesh couplers are well understood, and need not be further described here except to say that they permit the relative speeds of two rotating components to be matched prior to engaging the components for transmission of torque therebetween. The transmission of the invention and of this embodiment is suitable for use with any conventional kind of synchromesh coupler.

The gear wheels, and corresponding speed ratios, are now described with reference to FIG. 2.

The six upper speed ratios in this embodiment are conventional, and comprise respective pairs of gear wheels mounted on the input shafts 21, 22 and forward layshaft 31. Torque output from the transmission is via an output gear wheel 52 which is in permanent mesh with the output gear wheel 51, to which the output shaft 23 is coupled by, for example, a spline.

In the transmission of this north/south embodiment, the permanent mesh between forward layshaft 31 and output shaft 23 is at the tail end of the transmission, in contrast to the conventional arrangement whereby a layshaft is in permanent mesh with an input shaft.

Speed ratios 1, 3, 5 in this embodiment are provided on the inner input shaft, and comprise a gear wheel 61 directly machined on the inner input shaft for forward speed 1, and loose gear wheels 62, 63 for forward speeds 3 and 5. The gear wheels 61-63 are in permanent mesh with corresponding gear wheels 64-66 of the forward layshaft 31; the gear wheel 64 for forward speed 1 is loose on the layshaft 31, and the gear wheels 65, 66 for forward speeds 3 and 5 are fixed for rotation with the layshaft 31.

A double acting synchromesh coupler 67 is provided between gear wheels 62, 63, and is movable left and right from a neutral mid-position (as illustrated) to couple one or other gear wheel 62, 63 to the inner input shaft 21.

A double acting synchromesh coupler 68 is provided next to gear wheel 64, and is movable from a neutral mid-position to the right as illustrated to couple gear wheel 64 to the forward layshaft 31.

Speed ratios 2, 4, 6 in this embodiment are provided on the outer input shaft 22, and comprise a gear wheel 71 fast with the outer input shaft for forward speed 2, and loose gear wheels 72, 73 for forward speeds 4 and 6. The gear wheels 71-73 are in permanent mesh with corresponding gear wheels 74-76 of the forward layshaft; the gear wheel 74 for forward speed 2 is loose on the layshaft 31, and the gear wheels 75, 76 for forward speeds 4 and 6 are fixed for rotation with the layshaft 31.

A double acting synchromesh coupler 77 is provided between gear wheels 72, 73, and is movable left and right from a neutral mid-position (as illustrated) to couple one or other gear wheels 72, 73 to the outer input shaft 22.

A double acting synchromesh coupler 78 is provided next to gear wheel 74, and is movable from a neutral mid-position to the left as illustrated to couple gear wheel 74 to the forward layshaft 31.

The loose gear wheels of ratios 1-6, namely 62-64 and 72-74, are mounted on the respective shafts by suitable needle roller bearings, which are unnumbered for reasons of clarity.

It will be appreciated that the arrangement of speed ratios 1-6 is somewhat symmetrical about the plane of the central web 39, and in particular the 'even' ratios 6, 4, 2 step down in diameter towards this plane, whereas the odd ratios, 1, 3, 5 step up in diameter. As a result, compared with some conventional arrangements, a relatively unobstructed space is formed in the centre of the transmission at the outside, as indicated by dotted outline 79, which may be utilized for close fitting of a gear selector mechanism of a manual transmission or for the actuators of an assisted manual transmission. As a result the transmission may be somewhat slimmer than hitherto, which for example permits an enlarged passenger space within a vehicle.

Figure 2:
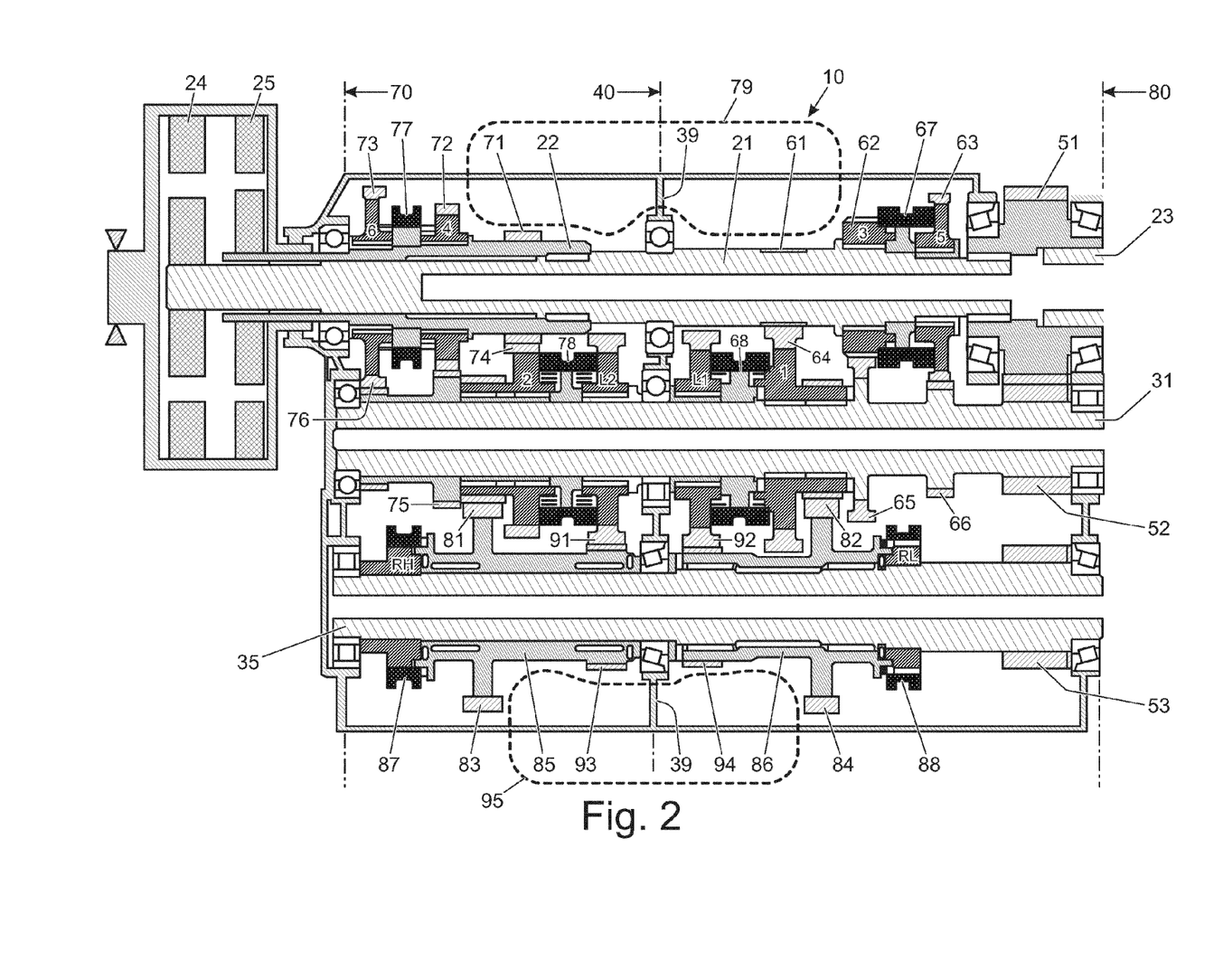
FIG. 2 corresponds to FIG. 1 and references additional features.

FIG. 2 illustrates the transmission casing 14 and web 39 crossing the space 79, but it will be understood that the casing can lie close to the gear wheels 61, 71 if necessary, or define an internal volume to accommodate a gear selector mechanism or other transmission component, such as a cooler for lubrication oil.

In use the sequential ratios 1-6 are selected one at a time to provide drive from one or other of the input shafts 21, 22 to the layshaft 31, and thence via the output gear wheels 52, 51 to the output shaft 23. The dual clutch permits pre-selection of the next ratio in the sequence (up or down the sequence), and a power shift by disengaging one clutch as the other is engaged, according to known techniques.

The transmission of this embodiment provides two reverse ratios, as will now be described.

The loose layshaft gear wheels of ratios 1 and 2, namely 64, 74, have respective reverse drive gear wheels 81, 82 coupled for rotation therewith. These double gear wheels 64, 82 and 74, 81 may be an assembly (fixed by e.g. welding), or may be machined from a common blank, as illustrated.

Each of the reverse drive gear wheels 81, 82 is one of a pair, the respective driven gear wheels 83, 84 being mounted for rotation with a respective sleeve 85, 86 on the reverse layshaft 35. Each sleeve 85, 86 can be coupled to the reverse layshaft 35 by a respective single acting synchromesh coupler 87, 88. At the tail end the reverse layshaft 35 carries an output gear wheel 53 which meshes with and directly drives the output gear wheel 51, and hence the output shaft 23.

Each sleeve 85, 86 is mounted for rotation on the reverse layshaft 35 by needle roller bearings, which are unnumbered for reasons of clarity.

In use each reverse ratio is obtained by drive via a respective clutch, respective double gear wheel (as idler), respective synchromesh coupler 87, 88 and reverse layshaft 35, to drive the output shaft 23 in reverse. By driving the two reverse ratios via different clutches, a power shift between reverse ratios is facilitated by pre-selection of the non-driving gear train.

The speed ratios within the transmission are determined by the relative diameters of the respective gear wheels, and are selected to give a desired spread of ratios with approximately equal steps between adjacent ratios.

In the illustrated embodiment $1^{st}$ and low reverse ratios share the same driving gear 61, which is associated with the inner input shaft 21. $2^{nd}$ and high reverse ratios are associated with driving gear 71 and the outer input shaft 22.

Accordingly the illustrated arrangement allows power shifting both between $1^{st}$ and high reverse, and between $2^{nd}$ and low reverse, in addition to other possibilities governed by the speed ratios associated with one or other of the clutches 24, 25.

The transmission of this embodiment also provides two further low forward speed ratios, as will now be described.

At the centre of the transmission, on either side of the central web 39, a loose gear wheel 91, 92 is provided on the forward layshaft 31. Each gear wheel 91, 92 is supported on suitable needle roller bearings, and may be engaged with the forward layshaft by movement of the adjacent synchromesh coupler 68, 78 toward the web 39. These synchromesh couplers 68, 78 are double acting (as noted above) and able to move from a neutral condition, as illustrated, to the left and right to engage a respective gear wheel with the forward layshaft 31.

The gear wheels 91, 92 mesh with corresponding gear wheels 93, 94 provided on respective sleeves 85, 86 which are driven from respective clutches via respective idler gears 74, 81 and 64, 82. The sleeves 85, 86 are thus associated both with reverse ratios and with the two low forward speed ratios.

The symmetry of the gear wheel and synchromesh arrangements on the forward and reverse layshafts will be noted, in particular the relatively unobstructed space 95 in the centre of the transmission at the outside which coincides with the space 79 in the practical arrangement in which the shaft axes 11, 12, 13 are at the apices of a triangle. This combined space further increases the possibilities for a slim transmission and an enlarged passenger space.

Six sequential forward speed ratios are provided as follows:
$1^{st}$

Synchromesh coupler 68 moves rightward. Drive via clutch 24; inner input shaft 21; gear wheel pair 61, 64; forward layshaft 31; output gear wheel pair 51, 52; output shaft 23.

2nd

Synchromesh coupler 78 moved leftward, drive via clutch 25; outer input shaft 22; gear wheel pair 71, 74; forward layshaft 31; output gear wheel pair 51, 52; output shaft 23.

3rd

Synchromesh coupler 67 moved leftward. Drive via clutch 24; inner input shaft 21; gear wheel pair 62, 65; forward layshaft 31; output gear wheel pair 51, 52; output shaft 23.

4$^{th}$

Synchromesh coupler 77 moved rightward. Drive via clutch 25; outer input shaft 22; gear wheel pair 72; 75; forward layshaft 31; output gear wheel pair 51, 52; output shaft 23.

5$^{th}$

Synchromesh coupler 67 moved rightward. Drive via clutch 24; inner input shaft 21; gear wheel pair 63, 66; forward layshaft 31; output gear wheel pair 51, 52; output shaft 23.

6$^{th}$

Synchromesh coupler 77 moved leftward. Drive via clutch 25; outer input shaft 22; gear wheel pair 73, 76; forward layshaft 31; output gear wheel pair 51, 52; output shaft 23.

Two reverse speed ratios are provided, as follows:

Reverse Low (RL)

Synchromesh coupler 88 moved leftward. Drive via clutch 24; inner input shaft 21; gear wheel train 61, 64, 82, 84; reverse layshaft 35; output gear wheel pair 53, 51; output shaft 23.

Reverse High (RH)

Synchromesh coupler 87 moved rightward. Drive via clutch 25; outer input shaft 22; gear wheel train 71, 74, 81, 83; reverse layshaft 35; output gear wheel pair 53, 51; output shaft 23.

Two additional low ratios are provided, as follows:

L1

Synchromesh coupler 68 moved leftward. Drive via clutch 24; inner input shaft 21; gear wheel train 61, 64, 82, 84; sleeve 86; gear wheel pair 94, 92; forward layshaft 31; output gear wheel pair 52, 51; output shaft 23.

L2

Synchromesh coupler 78 moved rightward. Drive via clutch 25; outer input shaft 22; gear wheel train 71, 74, 81, 83; sleeve 85; gear wheel pair 93, 91; forward layshaft 31; output gear wheel pair 52, 51; output shaft 23.

In the illustrated embodiment, the speed ratios provided are as follows:

| L1 | L2 | 1 | 2 | 3 | 4 | 5 | 6 | RL | RH |
|---|---|---|---|---|---|---|---|---|---|
| 18.12 | 9.21 | 5.32 | 3.28 | 2.21 | 1.55 | 1.17 | 0.93 | 8.3 | 4.68 |

The overall forward ratio spread is 19.5.

A feature of the invention is that engagement of one synchromesh coupler is required for each of the 10 ratios, and that the number of synchromesh couplers is restricted to four double acting and two single acting devices.

As noted above, by switching drive between clutches 24, 25, power shifts between two forward ratios, two reverse ratios, and forward/reverse ratios is possible, in numerous combinations.

It will be understood that the eight forward ratios may be defined as a six speed highway transmission with two low ratios, two overdrive ratios, or one low ratio and one overdrive ratio. In the described arrangement the six forward highway ratios are the highest ratios, and require two gear wheel pairs, whereas the two low forward ratios require four gear wheel pairs and are accordingly better suited to a low speed environment where the risk of gear wheel noise and backlash may be easier to accept.

The particular speed ratios provided by the illustrated embodiment, can of course be adjusted by altering the diameter of gear wheels and/or altering the relative positions of the axes 11, 12, 13, whilst also having regard to the use of particular gear wheels in more than one speed ratio.

One possibility for reducing the number of components is to provide direct coupling of the inner input shaft 21 and output shaft 23 by rightward movement of synchromesh coupler 67. Gear wheels 63, 66 are thereby eliminated. Such an arrangement gives direct drive in 5th ratio (1:1).

In order to further reduce 6$^{th}$ speed ratio, for example to give a significant ratio step for an overdrive, the diameter of the forward layshaft (at the left end as viewed) may be reduced. This permits a smaller diameter driven gear 76, and consequently a larger diameter driving gear 73. The diameter of the forward layshaft may for example be reduced toward the diameter inside the ball bearing 32, and this bearing may itself be reduced in diameter.

The symmetrical nature of the transmission, and the central bearing plane defined by the web 39, facilitates assembly of a transmission from both sides of the web 39, which may have advantages, particularly in the design of the casing 14. For assembly purposes it will be noted that the driven gear wheels 75, 76 of 4$^{th}$ and 6$^{th}$ ratio are formed together and fixed for rotation with the forward layshaft 31 by some suitable means. These gear wheels 75, 76 could be mounted separately on the forward layshaft.

In the event that a single clutch transmission is required, in which the clutch is disengaged whilst a ratio shift occurs, the dual input shafts 21, 22 are replaced by a single input shaft driven by the single clutch. The gear wheels 61-63 and 71-73 are mounted/formed as previously described on this single input shaft.

FIG. 3 illustrates a practical arrangement with the axes 11-13 disposed in triangular form. The output gear wheels 51-53 are illustrated in mesh at appropriate spacings.

Various possibilities of driving an output from the transmission are possible, in addition or as a substitute for drive from the output shaft 23.

In one embodiment the transmission of FIGS. 1-3 is provided longitudinally in a motor vehicle in a conventional 'systeme Panhard' arrangement with front mounted engine and driven axle at the rear.

A first arrangement for drive to the rear wheels of a vehicle is by conventional propeller shaft directly from the output gear wheel 51. Since the output gear wheels 52, 53 are in permanent mesh with gear wheel 51, further possibilities exist for direct drive from the layshafts 31, 35 taking into account the effect of gear and torque multiplication inherent in the diameters of the illustrated gear wheels 51-53. An output drive axis 12, 13 offset from the input drive axis 11 may have advantages in, for example, lowering a rear drive propeller shaft relative to the vehicle passenger space.

It will be understood that the output gear wheel 51 need not be coaxial if it is supported independently of the input shaft 21, and thus may be offset to permit a further variation in speed ratio by change of diameter thereof.

Figure 4:
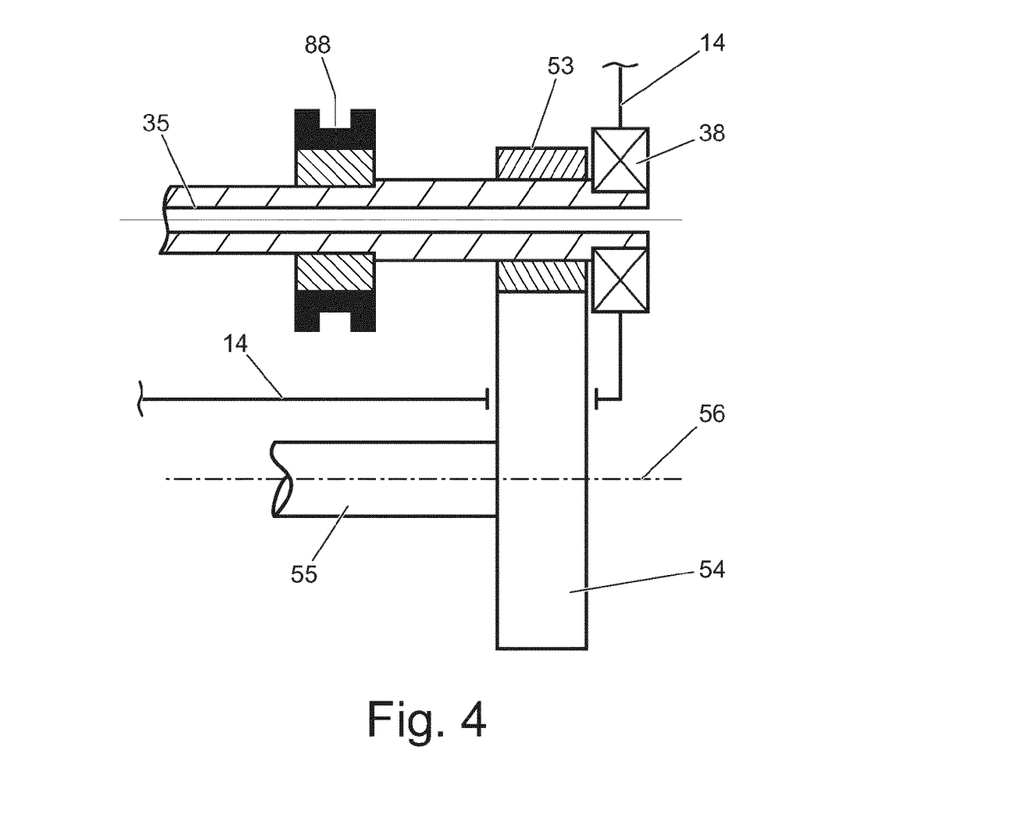
FIGS. 4-6 are scrap sections illustrating alternative and additional drive arrangements alongside the transmission casing of FIGS. 1 and 2.

In a four wheel drive arrangement of a motor vehicle with front and rear axles, a front drive may be arranged from the reverse layshaft, in particular from the output gear 53. FIG. 4 shows one option whereby the output gear wheel 53 drives a gear wheel 54 from which drive is taken forwardly by a front drive shaft 55. Drive is taken rearwardly via the output shaft 23 as previously described. The drive axis 56 of the front drive shaft 55 is parallel and outboard of the transmission casing/engine 14 so as to avoid interference therewith. In an alternative, the axis of the front drive shaft may be at a divergent angle, so as to increase clearance. The angle may be in the range 3-15°.

In a further alternative the gear wheel 53 or gear wheel 54 may be disconnectable (for example by dog clutch, synchroniser clutch or wet clutch) to permit disengagement of a front drive shaft on demand. Such an arrangement is convenient, being at one end of a shaft, and is useful both in providing switchable four wheel drive, and improving fuel economy.

Figure 5:
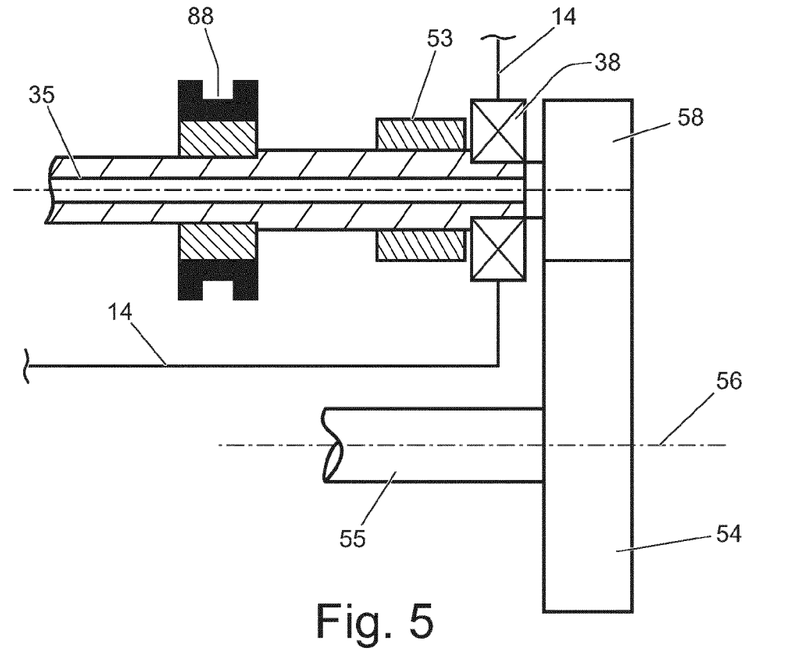

In an alternative a spur gear may be arranged on the other side of the reverse layshaft bearing 38, as illustrated in FIG. 5. Such an arrangement may give improved modularity, whereby a standard transmission may be adapted to four wheel drive by addition of an auxiliary spur gear 58 and casing to the outside thereof. When not provided, the necessary aperture in the casing may be closed by a cover plate.

In further alternatives, the options of FIGS. 4 and 5 may comprise a drive to a spur gear via endless link, such as multi-row chain. This arrangement reverses the direction of rotation of the front drive shaft, which may assist in cancelling the torque reaction effects of rotating drive shafts on the power train. The drive member 57 of the endless link 59 may be provided between the synchromesh coupling 88 and the output gear 53 as shown in FIG. 6, or outboard of the output gear 53 as a modular addition.

Figure 6:
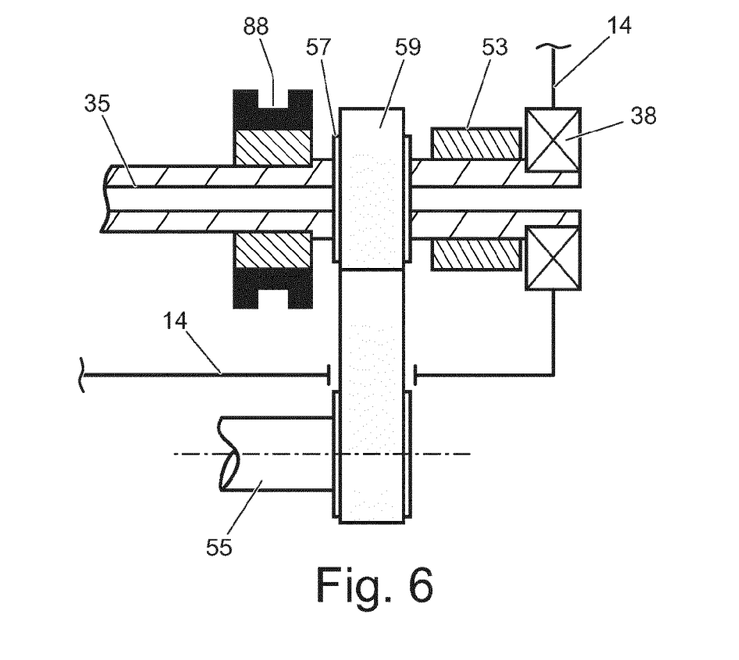

It will be understood that drive may alternatively be taken solely rearwardly in the arrangements of FIGS. 4-6, and both forwardly and rearwardly.

It will also be understood that the outboard drive arrangement of FIG. 5, the gear wheel and endless belt options can both alternatively be provided on the forward layshaft 31 adjacent the tail end support bearing 34.

As described above, one arrangement provides for rearward and forward facing propeller shafts. It will be understood that a solely rearward or solely forward option is also possible, without altering the basic arrangement of shafts, synchromesh couplers and gear wheels.

In an additional variant, either of the front and rear drive arrangements of FIGS. 4-6 may be alternatively used to provide a power take-off for a pump, winch or other powered device.

In a four wheel drive transmission it is desirable to include a centre differential gear to avoid transmission wind-up between the front and rear vehicle axles. Some such arrangements are illustrated in FIGS. 7-10.

Figure 7:
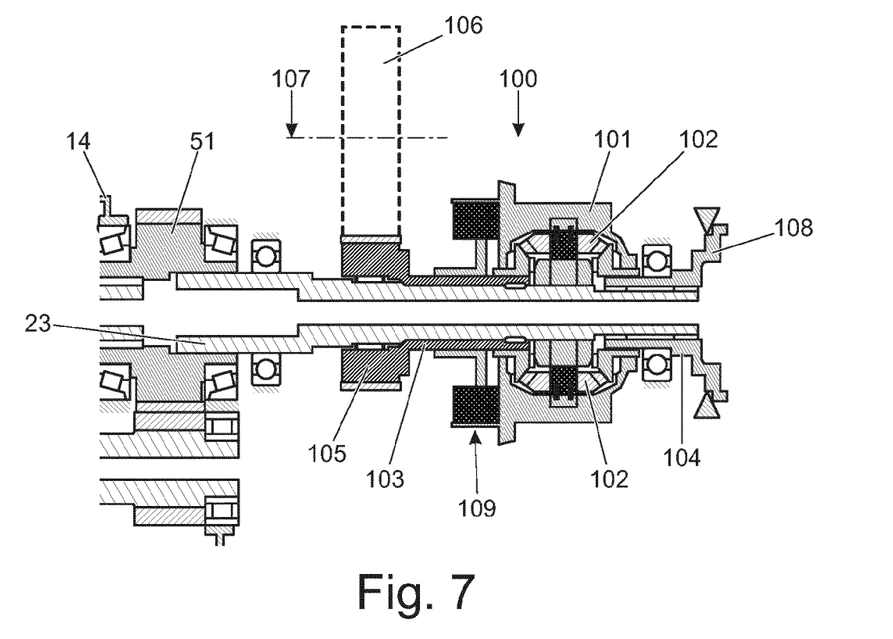
FIGS. 7-9 are schematic scrap sections showing alternate arrangements for a differential gear and double drive for the transmission of FIGS. 1 and 2.

In FIG. 7 the output gear 51 and output shaft 23 are as illustrated in FIGS. 1 and 2. The output shaft 23 extends rearwardly to a conventional differential gear 100 having the usual carrier housing 101 and planet gears 102. The planet gears mesh with corresponding gears of a forward output shaft 103 and a rearward output shaft 104. The forward output shaft 103 is co-axial about the output shaft 23, and terminates in a gear wheel 105 which is paired with a gear wheel 106 rotatable about a parallel axis 107. A drive between wheels 105, 106 by endless link is also possible. The gear wheel 106 may in practice be connected to a forward drive shaft passing alongside the transmission casing 14. The gear wheels 105, 106 may alternatively be replaced by sprockets and an endless link, as described with reference to FIG. 6.

The rearward output shaft 104 terminates in a flange connection 108 or other suitable coupling for a rear drive arrangement. Support bearings of conventional kind are provided as illustrated.

In use the differential gear acts in a known manner to equalize driving torque to the forward and rearward output shafts 103, 104. A conventional lock or limited slip mechanism 109 may be provided to allow relative rotation of the carrier 101 to be restricted or prevented. Such an arrangement is desirable in low traction conditions in order to maintain drive to one or other axle.

The component parts of the differential gear of FIG. 7 are arranged in a casing (not shown), and may comprise a modular attachment for the transmission of FIGS. 1 and 2. Such a casing is illustrated in the alternative arrangement of FIG. 8.

Figure 8:
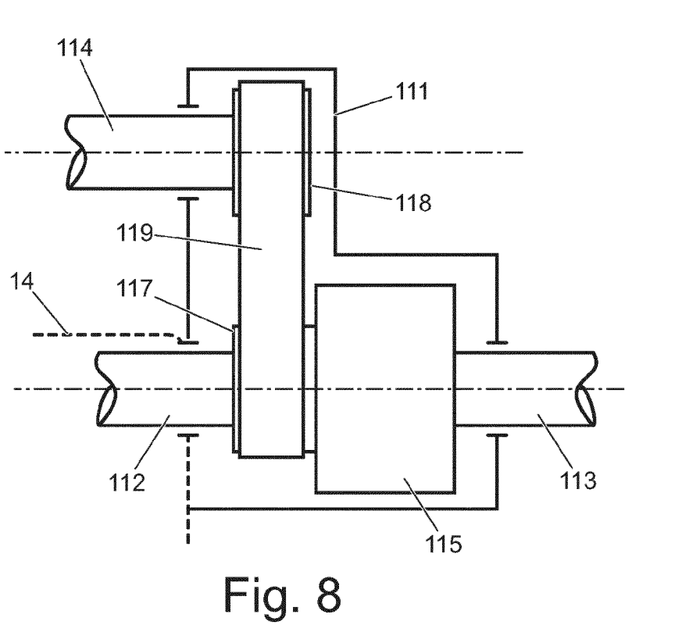

In FIG. 8, a transfer case mounted to the rear of the transmission casing 14 comprises a transfer housing 111 having an input shaft 112 from the output shaft 23, a rearward output shaft 113 and a forward output shaft 114. Each output shaft 113, 114 may terminate at a respective flange (not shown) for connection to rearward and forward propeller shafts. Within the casing is provided a Torsen® or other type differential (115), the details of which are well known and need not be further described here. Drive to the forward output 113 shaft is via sprockets 117, 118 and a multi-link chain 119, but other kinds of endless link, and spur or helical gears are a possible option. The transfer case may be a modular attachment for the transmission of FIGS. 1 and 2. Suitable rolling element bearings are provided in the transfer housing to support the shafts 112, 113, 114.

Figure 9:
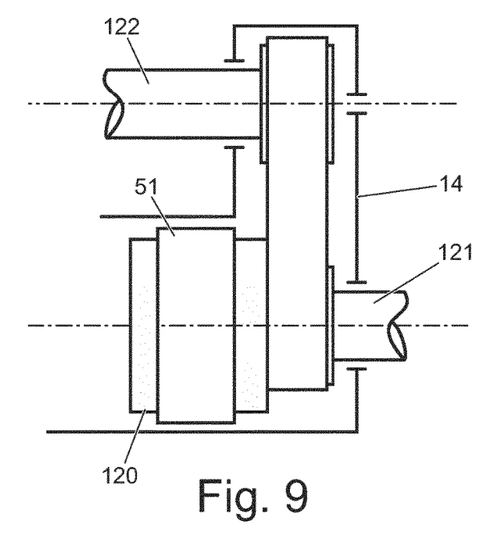
Figure 10:
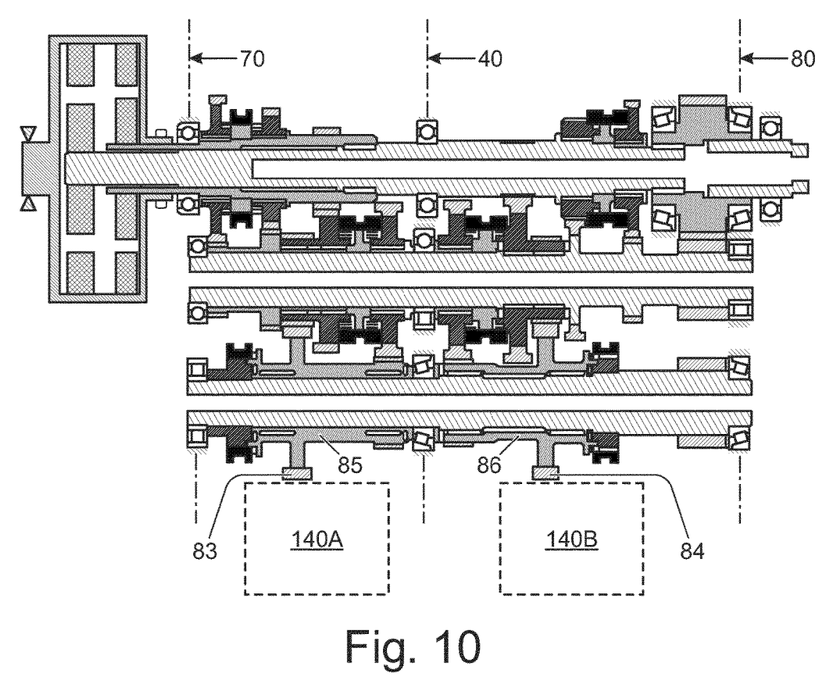
FIG. 10 shows schematically a potential location for a power take-off connection to the transmission of FIGS. 1 and 2.

In the arrangement of FIG. 9, a differential gear 120 is integrated into the transmission casing 14 of FIGS. 1 and 2 in order to reduce the overall length and weight, as compared with the modular arrangement of e.g. FIG. 8. A chain drive is again provided to outputs 121, 122, and a gear drive is an option. Rolling element bearings will be provided as necessary.

The differential gear of FIGS. 8 and 9 could be a planetary differential, an epicyclic differential, or any other suitable kind having two outputs from one input.

The transmission of FIGS. 1-2 may also be suited for use in a hybrid vehicle, in which the usual internal combustion engine is supplemented by an alternative energy storage device such as a battery/electric motor. In this respect the input gear wheels 63, 73 may be most suitable for connection to an electric drive motor, and in this case one or both of the gear wheels 63, 73 may be fixed to the respective input shaft 21, 22, in which case the coupled gear 66, 76 will be connected to the forward layshaft 31 via a respective synchromesh coupler. This arrangement corresponds to the layshaft mounted couplers 68, 78.

Figure 11:
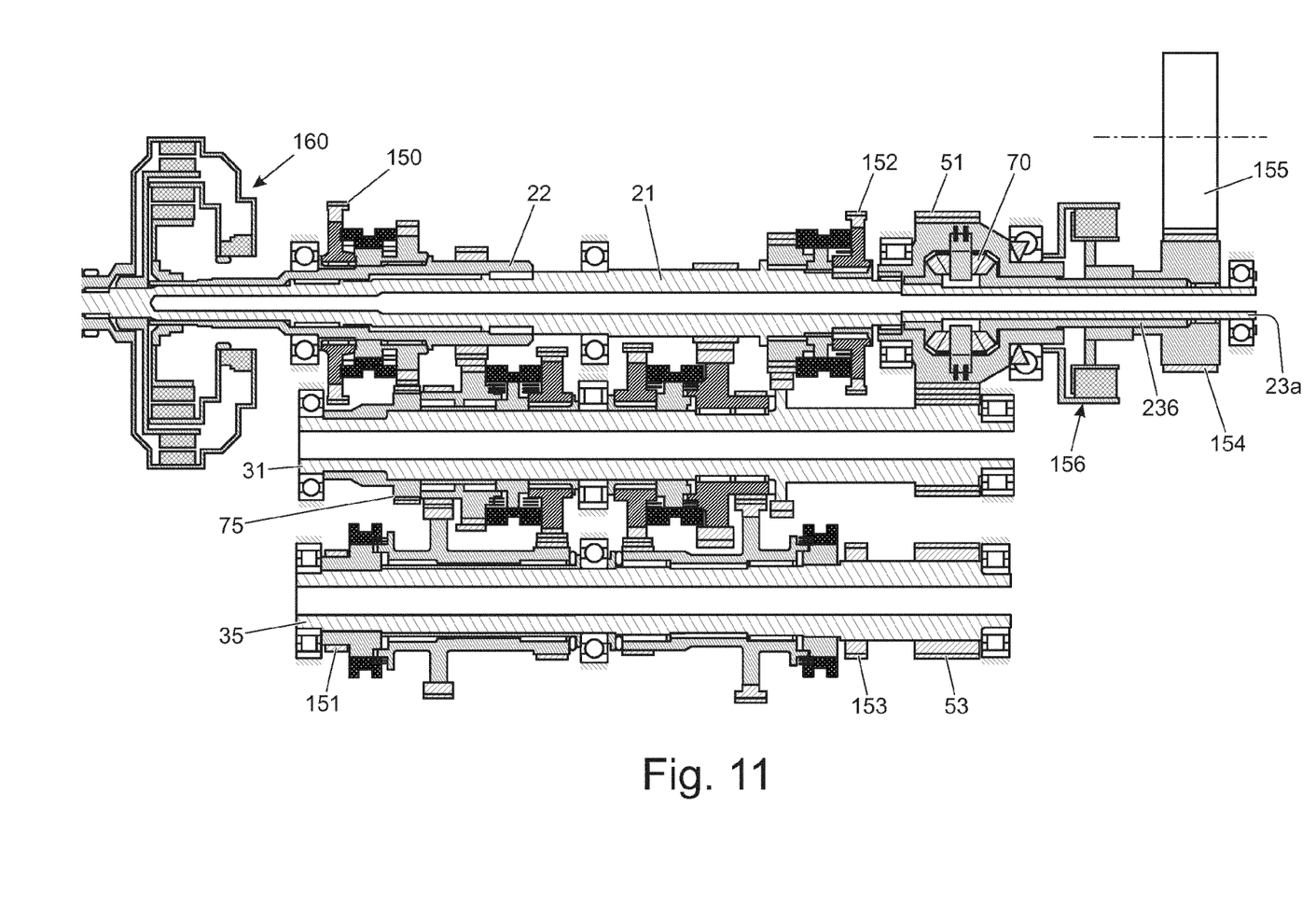
FIG. 11 shows schematically some variations to the transmission of FIGS. 1 and 2.

A transmission corresponding to FIGS. 1 and 2 is illustrated in FIG. 11, and two potential locations 140A, 140B for a power take-off are provided, one each associated with respective gears 83, 84 of the sleeves 85, 86 of the reverse layshaft 35.

In use a hybrid vehicle having a storage battery could power an electric motor on demand to drive the transmission via the gears 83, 84 whilst the clutches 24, 25 are disengaged. It is envisaged that one such motor would be sufficient, but the gears 83, 84 may provide two potential ratio options in addition to two potential locations. Such an electric motor may also act as a generator for the storage battery, for example on vehicle overrun.

FIG. 11 illustrates a transmission corresponding to that of FIGS. 1 and 2, but with variations. It will be apparent from comparison that many of the features are identical, and a corresponding description of those features is omitted. In particular the transmission is substantially identical inform in respect of speed ratios 1, 2, 3, 4, L1, L2, RL and RH.

The highest forward speed ratios are, in the embodiment of FIG. 11, provided by a respective gear wheel pair 150, 151 and 152, 153 provided directly between the respective input shaft 21, 22 and the reverse layshaft 35. These gear pairs are in the same respective plane as in the embodiment of FIGS. 1 and 2, but no longer utilize the forward layshaft 31 on output. Rather the reverse layshaft 35 provides the output via output gears 53, 51.

Although FIG. 11 does not show the gear wheels 150-153 in mesh, it will be understood that this is because the shafts are in practice arranged as shown in FIG. 3.

The arrangement of FIG. 11 permits lower $5^{th}$ and $6^{th}$ speed ratios of 0.98 and 0.77 respectively, whilst avoiding any increase in the number of gear wheels in the drive train.

It will be observed that the left end (as viewed) of the forward layshaft 31 is of lesser diameter than that illustrated in FIGS. 1 and 2 in the region of the $4^{th}$ speed driven gear wheel 75, so as to permit the diameter of the $6^{th}$ speed drive gear wheel 150 to be increased.

FIG. 11 also illustrates an alternative clutch arrangement 160 in which clutches associated with respective input shafts are arranged one radially within the other. Such an arrangement is a conventional alternative. The kind of clutch (friction, electromagnetic etc.) can in each case be determined according to service requirements.

A further distinction of FIG. 11 is the incorporation of a conventional differential gear 170 within the output gear 51 so as to provide co-axial outputs 23*a*, 23*b*. Output shaft 23*a* is intended for connection to a rear drive shaft/axle. Output shaft 23*b* has an output gear or sprocket 154 fixed for rotation therewith, and thus gear/sprocket 154 may be used for drive to a driven gear or sprocket 155 for connection to a forward facing drive shaft of a front axle.

A wet clutch pack 156 is provided about the co-axial output shafts 23*a*, 23*b*, and when engaged locks the differential carrier to output shaft 23*b* so as to provide a locked differential, as would typically be provided in a four wheel drive vehicle/or any vehicle having front and rear driven axles.

Certain aspects of the invention are stated in the numbered paragraphs that follow:

1. A constant mesh gearbox providing a plurality of forward speed ratios, said gearbox comprising a casing defining a plurality of parallel shaft axes having shafts rotatable thereon, and between which gear wheel pairs associated with each speed ratio are arranged to transmit torque, said casing further defining a support plane substantially orthogonal to said axes and containing a support bearing for a shaft on each of said axes, said gearbox providing four or more forward speed ratios, the gear wheel pairs associated with the 'odd' forward speed ratios being provided on one side of said support plane, and the gear pairs associated the 'even' forward speed ratios being provided on the other side of said support plane.
2. A gearbox according to aspect 1, and having two reverse speed ratios, the gear wheel pairs associated with one of said reverse speed ratios being provided on one side of said support plane, and the gear wheel pairs associated with the other of said reverse speed ratio being provided on the other side of said support plane.
3. A gearbox according to aspect 1, and comprising an input shaft, an output shaft and two layshafts.
4. A gearbox according to aspect 3, and comprising two co-axial input shafts.
5. A gearbox according to aspect 4, wherein said input shafts are arranged one within the other.
6. A gearbox according to aspect 3, and comprising two layshafts only.
7. A gearbox according to aspect 6, wherein said layshafts are engaged with said output shaft via respective gear wheels.
8. A gearbox according to aspect 1, wherein on one side of said support plane the gear wheels of an input shaft decrease progressively in diameter toward said plane, and on the other side of said support plane the gear wheels of an input shaft increase progressively in diameter away from said plane.
9. A gearbox according to aspect 1, wherein said support plane is defined by a transverse web of said casing, said web providing a plurality of bearings, one for each shaft passing through said support plane.
10. A gearbox according to aspect 9, wherein each of said bearings is a rolling element bearing.
11. A gearbox according to aspect 1, and further defining two end support planes having substantially therein respective support bearings for each end of shafts rotatable in said casing.
12. A gearbox according to aspect 11, wherein support bearings for layshafts are provided in parallel end support planes.
13. A gearbox according to aspect 12, wherein said layshafts are geared together by spur gear wheels inboard of said end support planes.
14. A gearbox according to aspect 1, and having eight forward speed ratios, six forward speed ratios being defined by gear wheel pairs directly between an input shaft and a first layshaft, and two forward speed ratios being defined by a gear train between an input shaft and a first layshaft via first idlers of the first layshaft and second idlers of a second layshaft.
15. A gearbox according to aspect 14, wherein said first idlers comprise first driving and first driven gear wheels connected for rotation in common.
16. A gearbox according to aspect 14, wherein said second idlers comprise second driving and second driven gear wheels connected for rotation in common, said second driven gear wheels being immediately adjacent said support plane.
17. A gearbox according to aspect 14, wherein said second idlers are connectable to said second layshaft.
18. A gearbox according to aspect 1, wherein each speed ratio is individually selectable via movement of a synchromesh coupler.
19. An internal combustion engine having a crankcase coupled to the casing of a gearbox according to aspect 1.
20. A vehicle incorporating a gearbox according to aspect 1.

The invention claimed is:
1. A constant mesh gearbox providing a plurality of forward speed ratios, said gearbox comprising a casing defining a plurality of parallel shaft axes having shafts rotatable thereon, and between which gear wheel pairs associated with each speed ratio are arranged to transmit torque, said casing defining a support plane substantially orthogonal to said axes and containing a support bearing for a shaft on each of said axes, said gearbox providing four or more forward speed ratios, the gear wheel pairs associated with odd forward speed ratios being provided on one side of said support plane, and the gear wheel pairs associated with even forward speed ratios being provided on the other side of said support plane, the arrangement of speed ratios being at least partially symmetrical about the support plane and wherein on the one side of said support plane the gear wheels of an input shaft decrease progressively in diameter toward said support plane, and on the other side of said support plane the gear wheels of an input shaft increase progressively in diameter away from said support plane, said gearbox including two reverse speed ratios, the gear wheel pairs associated with one of said reverse speed ratios being provided on the one side of said support plane, and the gear wheel pairs associated with the other of said reverse speed ratios being provided on the other side of said support plane.

2. A gearbox according to claim 1, comprising an input shaft, an output shaft and two layshafts.

3. A gearbox according to claim 2, comprising two co-axial input shafts.

4. A gearbox according to claim 3, wherein said input shafts are arranged one within the other.

5. A gearbox according to claim 2, wherein said output shaft is coaxial with the input shaft.

6. A gearbox according to claim 2, comprising two layshafts only.

7. A gearbox according to claim 6, wherein said layshafts are engaged with said output shaft via respective gear wheels.

8. A gearbox according to claim 1, wherein said support plane is defined by a transverse web of said casing, said web providing a plurality of bearings, one for each shaft passing through said support plane.

9. A gearbox according to claim 1, including two end support planes having substantially therein respective support bearings for each end of the shafts rotatable in said casing.

10. A gearbox according to claim 9, comprising layshafts and support bearings for the layshafts provided in parallel end support planes.

11. A gearbox according to claim 10, wherein said layshafts are geared together by spur gear wheels inboard of said end support planes.

12. A gearbox according to claim 1, having eight forward speed ratios, six forward speed ratios being defined by gear wheel pairs directly between an input shaft and a first layshaft, and two forward speed ratios being defined by a gear train between an input shaft and the first layshaft via first idlers of the first layshaft and second idlers of a second layshaft.

13. A gearbox according to claim 12, wherein said first idlers comprise first driving and first driven gear wheels connected for rotation in common.

14. A gearbox according to claim 12, wherein said second idlers comprise second driving and second driven gear wheels connected for rotation in common, said second driven gear wheels being immediately adjacent said support plane.

15. A gearbox according to claim 12, wherein said second idlers are connectable to said second layshaft.

16. A gearbox according to claim 1, wherein each speed ratio is individually selectable via movement of a synchromesh coupler.

17. An internal combustion engine having a crankcase coupled to the casing of a gearbox according to claim 1.

18. A vehicle powertrain or a vehicle incorporating a gearbox according to claim 1.

19. A vehicle comprising a gearbox according to claim 1.

20. A constant mesh gearbox providing a plurality of forward speed ratios, said gearbox comprising a casing defining a plurality of parallel shaft axes having shafts rotatable thereon, and between which gear wheel pairs associated with each speed ratio are arranged to transmit torque, said casing further defining a support plane substantially orthogonal to said axes and containing a support bearing for a shaft on each of said axes, said gearbox providing four or more forward speed ratios, the gear wheel pairs associated with odd forward speed ratios being provided on one side of said support plane as a first series of gear wheel pairs, and the gear wheel pairs associated with even forward speed ratios being provided on an opposite side of said support plane as a second series of gear wheel pairs, and wherein on the one side of said support plane the gear wheels of an input shaft belonging to the first series of gear wheel pairs decrease progressively in diameter toward said support plane, and on the opposite side of said support plane the gear wheels of an input shaft belonging to the second series of gear wheel pairs increase progressively in diameter away from said support plane, said gearbox having two reverse speed ratios, gear wheel pairs associated with one of said reverse speed ratios being provided on the one side of said support plane, and gear wheel pairs associated with the other of said reverse speed ratios being provided on the opposite side of said support plane.

* * * * *